United States Patent
Kalla et al.

(10) Patent No.: US 7,949,859 B2
(45) Date of Patent: *May 24, 2011

(54) MECHANISM FOR AVOIDING CHECK STOPS IN SPECULATIVE ACCESSES WHILE OPERATING IN REAL MODE

(75) Inventors: Ronald N. Kalla, Round Rock, TX (US); Cathy May, Millwood, NY (US); Balaram Sinharoy, Poughkeepsie, NY (US); Edward John Silha, Austin, TX (US); Shih-Hsiung S. Tung, Austn, TX (US)

(73) Assignee: International Business Machines Corporation, Armonk, NY (US)

( * ) Notice: Subject to any disclaimer, the term of this patent is extended or adjusted under 35 U.S.C. 154(b) by 549 days.

This patent is subject to a terminal disclaimer.

(21) Appl. No.: 12/043,747

(22) Filed: Mar. 6, 2008

(65) Prior Publication Data

US 2009/0193233 A1    Jul. 30, 2009

Related U.S. Application Data

(63) Continuation of application No. 10/424,527, filed on Apr. 25, 2003, now Pat. No. 7,370,177.

(51) Int. Cl.
G06F 9/00    (2006.01)
(52) U.S. Cl. ........................ 712/225; 712/220
(58) Field of Classification Search .................. 712/225, 712/220
See application file for complete search history.

(56) References Cited

U.S. PATENT DOCUMENTS

| 5,561,814 | A | 10/1996 | Glew et al. | 710/13 |
| 5,692,121 | A | 11/1997 | Bozso et al. | 395/182.11 |
| 5,954,825 | A | 9/1999 | Kaiser et al. | 714/43 |
| 5,956,753 | A | 9/1999 | Grew et al. | 711/205 |
| 6,502,208 | B1 | 12/2002 | McLaughlin et al. | 714/25 |
| 6,697,971 | B1 | 2/2004 | Dwyer | 714/54 |
| 6,807,616 | B1 | 10/2004 | McGrath et al. | 711/206 |

OTHER PUBLICATIONS

"Electrical Engineering Dictionary"; 2000; CRC Press LLC.
Hennessy et al.; "Computer Architecture: A Quantitative Approach"; $3^{rd}$ Edition; May 2002.

*Primary Examiner* — Chun-Kuan Lee
*Assistant Examiner* — Benjamin P Geib
(74) *Attorney, Agent, or Firm* — Matthew W. Baca; Winstead, Sechrest, Minick

(57) ABSTRACT

A method and processor for avoiding check stops in speculative accesses. An execution unit, e.g., load/store unit, may be coupled to a queue configured to store instructions. A register, coupled to the execution unit, may be configured to store a value corresponding to an address in physical memory. When the processor is operating in real mode, the execution unit may retrieve the value stored in the register. Upon the execution unit receiving a speculative instruction, e.g., speculative load instruction, from the queue, a determination may be made as to whether the address of the speculative instruction is at or below the retrieved value. If the address of the speculative instruction is at or below this value, then the execution unit may safely speculatively execute this instruction while avoiding a check stop since all the addresses at or below this value are known to exist in physical memory.

2 Claims, 4 Drawing Sheets

Physical Memory

MECHANISM FOR AVOIDING CHECK STOPS IN SPECULATIVE ACCESSES WHILE OPERATING IN REAL MODE

CROSS REFERENCE TO RELATED APPLICATIONS

The present application is a continuation application of pending U.S. patent application Ser. No. 10/424,527, which was filed on Apr. 25, 2003, which is assigned to the assignee of the present invention. The present application claims priority benefits to U.S. patent application Ser. No. 10/424,527.

TECHNICAL FIELD

The present invention relates to the field of out-of-order processing, and more particularly to a mechanism for avoiding check stops in speculative accesses while operating in real mode.

BACKGROUND INFORMATION

Modern processors employed in computer systems use various techniques to improve their performance. One of these techniques is for the processor to use dynamic instruction scheduling in which the processor executes instructions out of order, i.e., in an order different than that specified by the programmer or compiler. For example, dynamic instruction scheduling may allow the processor to speculate as to whether a branch instruction will be taken or not taken based on some prior history. If a branch instruction is predicted to be taken, then the flow of the program is altered, i.e., the sequence of instruction execution is altered. If the branch instruction is predicted to not be taken, then the following sequential instructions are executed. In either case, the stream of instructions executed are said to be "speculatively" executed. If the branch is predicted incorrectly, i.e., the processor predicted incorrectly as to whether a branch instruction will be taken or not, the speculatively executed instructions are flushed.

Processors may operate in a mode, commonly referred to as a "real mode," where no virtual address translation is performed. That is, the effective address, i.e., the address of the program or compiler, is used as the real address, i.e., the address of physical memory. If the effective address does not correspond to the real address, then the computer system may experience what is commonly referred to as a "check stop." A check stop may refer to crashing of the computer system as a result of attempting to locate a real address that does not exist in physical memory.

In a computer system incorporating the above technique to improve processor performance, such as a processor with out-of-order execution, certain instructions, e.g., load instruction, may not be speculatively executed in order to prevent a check stop from occurring while operating in real mode. For example, when operating in real mode, the processor will not speculatively execute a load instruction after the processor predicts a branch instruction will be taken or not taken in order to prevent a check stop. By prohibiting speculative execution of certain instructions, such as load instructions, to ensure against check stops, processor performance is hindered.

Therefore, there is a need in the art to be able to speculatively execute instructions while avoiding check stops when operating in real mode.

SUMMARY

The problems outlined above may at least in part be solved in some embodiments by a register storing a value corresponding to an address in physical memory. Addresses at or below this value may correspond to real addresses that exist in the physical memory space. When the processor is operating in real mode, an execution unit, such as a load/store unit, may retrieve the value stored in the register. Upon the execution unit receiving a speculative instruction, e.g., speculative load instruction, a determination may be made as to whether the address of the speculative instruction is at or below the retrieved value. If the address of the speculative instruction is at or below this value, then the execution unit may safely speculatively execute this instruction while avoiding a check stop since all the addresses at or below this value are known to exist in physical memory.

In one embodiment of the present invention, a method for avoiding check stops in speculative accesses may comprise the step of receiving a speculative instruction with an address. The method may further comprise comparing the speculative instruction address to an address range in physical memory. The method may further comprise speculatively executing the speculative instruction if the address of the speculative instruction is within the address range in physical memory.

The foregoing has outlined rather broadly the features and technical advantages of one or more embodiments of the present invention in order that the detailed description of the invention that follows may be better understood. Additional features and advantages of the invention will be described hereinafter which form the subject of the claims of the invention.

BRIEF DESCRIPTION OF THE DRAWINGS

A better understanding of the present invention can be obtained when the following detailed description is considered in conjunction with the following drawings, in which.

DETAILED DESCRIPTION

Figure 1:
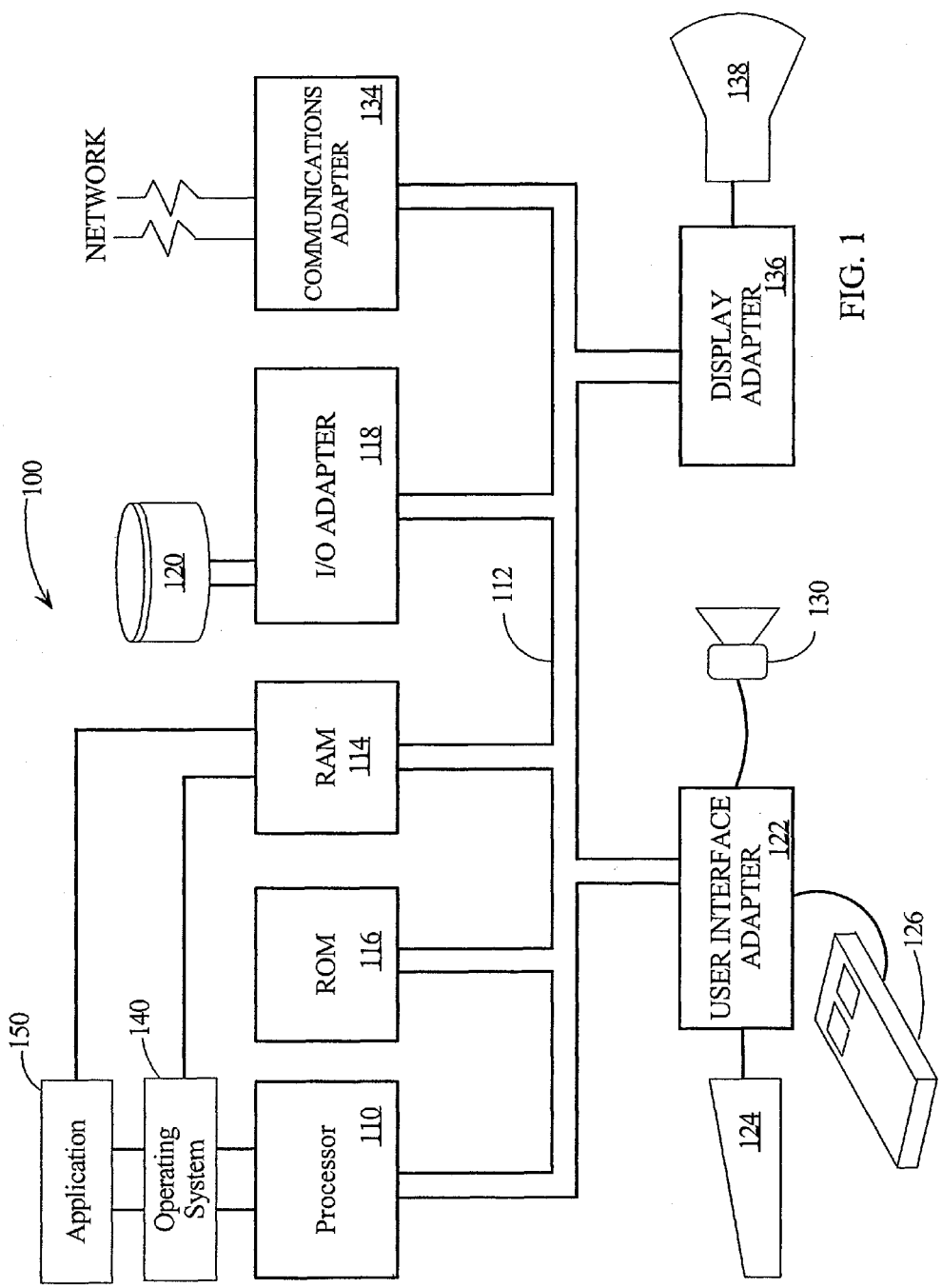
FIG. 1 illustrates an embodiment of the present invention of a computer system.

The present invention comprises a method and processor for avoiding check stops in speculative accesses. In one embodiment of the present invention, an execution unit, e.g., load/store unit, may be coupled to a queue configured to store instructions. A register, coupled to the execution unit, may be configured to store a value corresponding to an address in physical memory. When the processor is operating in real mode, the execution unit may retrieve the value stored in the register. Upon the execution unit receiving a speculative instruction, e.g., speculative load instruction, from the queue, a determination may be made as to whether the address of the speculative instruction is at or below the retrieved value. If the address of the speculative instruction is at or below the value, then the execution unit may safely speculatively execute this instruction while avoiding a check stop since all the addresses at or below this value are known to exist in physical memory.

Although the present invention is described with reference to a simultaneous multithreading processor, it is noted that the principles of the present invention may be applied to any type of processor including single thread and other types of multithreading, e.g., course grained, fine-grained multithreading. It is further noted that a person of ordinary skill in the art would be capable of applying the principles of the present invention as discussed herein to any type of processor. It is further noted that embodiments applying the principles of the present invention to any type of processor would fall within the scope of the present invention.

It is further noted that although the present invention is described with reference to a load/store unit speculatively executing load instructions when the processor operates in real mode if the addresses of the speculative load instructions are at or below a value stored in a register, that the principles of the present invention may be applied to any execution unit speculatively executing any type of instruction. It is further noted that a person of ordinary skill in the art would be capable of applying the principles of the present invention as discussed herein to any type of execution unit speculatively executing any type of instruction. It is yet further noted that embodiments applying the principles of the present invention to any type of execution unit speculatively executing any type of instruction would fall within the scope of the present invention.

In the following description, numerous specific details are set forth to provide a thorough understanding of the present invention. However, it will be apparent to those skilled in the art that the present invention may be practiced without such specific details. In other instances, well-known circuits may be shown in block diagram form in order not to obscure the present invention in unnecessary detail. For the most part, details considering timing, data formats within communication protocols, and the like have been admitted inasmuch as such details are not necessary to obtain a complete understanding of the present invention and are within the skills of persons of ordinary skill in the relevant art.

FIG. 1—Computer System

FIG. 1 illustrates a hardware configuration of computer system 100 which is representative of a hardware environment for practicing the present invention. Computer system 100 may have a processing unit 110 coupled to various other components by system bus 112. Processing unit 110 may be a simultaneous multithreading processor as described in detail below in conjunction with FIG. 2. An operating system 140 may run on processor 110 and provide control and coordinate the functions of the various components of FIG. 1. An application 150 in accordance with the principles of the present invention may run in conjunction with operating system 140 and provide calls to operating system 140 where the calls implement the various functions or services to be performed by application 150. Read-Only Memory (ROM) 116 may be coupled to system bus 112 and include a basic input/output system ("BIOS") that controls certain basic functions of computer system 100. Random access memory (RAM) 114 and disk adapter 118 may also be coupled to system bus 112. It should be noted that software components including operating system 140 and application 150 may be loaded into RAM 114, which may be computer system's 100 main memory for execution. Disk adapter 118 may be an integrated drive electronics ("IDE") adapter that communicates with a disk unit 120, e.g., a disk drive.

Computer system 100 may further comprise a communications adapter 134 coupled to bus 112. Communications adapter 134 may interconnect bus 112 with an outside network enabling computer system 100 to communicate with other such systems. I/O devices may also be connected to system bus 112 via a user interface adapter 122 and a display adapter 136. Keyboard 124, mouse 126 and speaker 130 may all be interconnected to bus 112 through user interface adapter 122. Event data may be inputted to computer system 100 through any of these devices. A display monitor 138 may be connected to system bus 112 by display adapter 136. In this manner, a user is capable of inputting to computer system 100 through keyboard 124 or mouse 126 and receiving output from computer system 100 via display 138.

Figure 2:
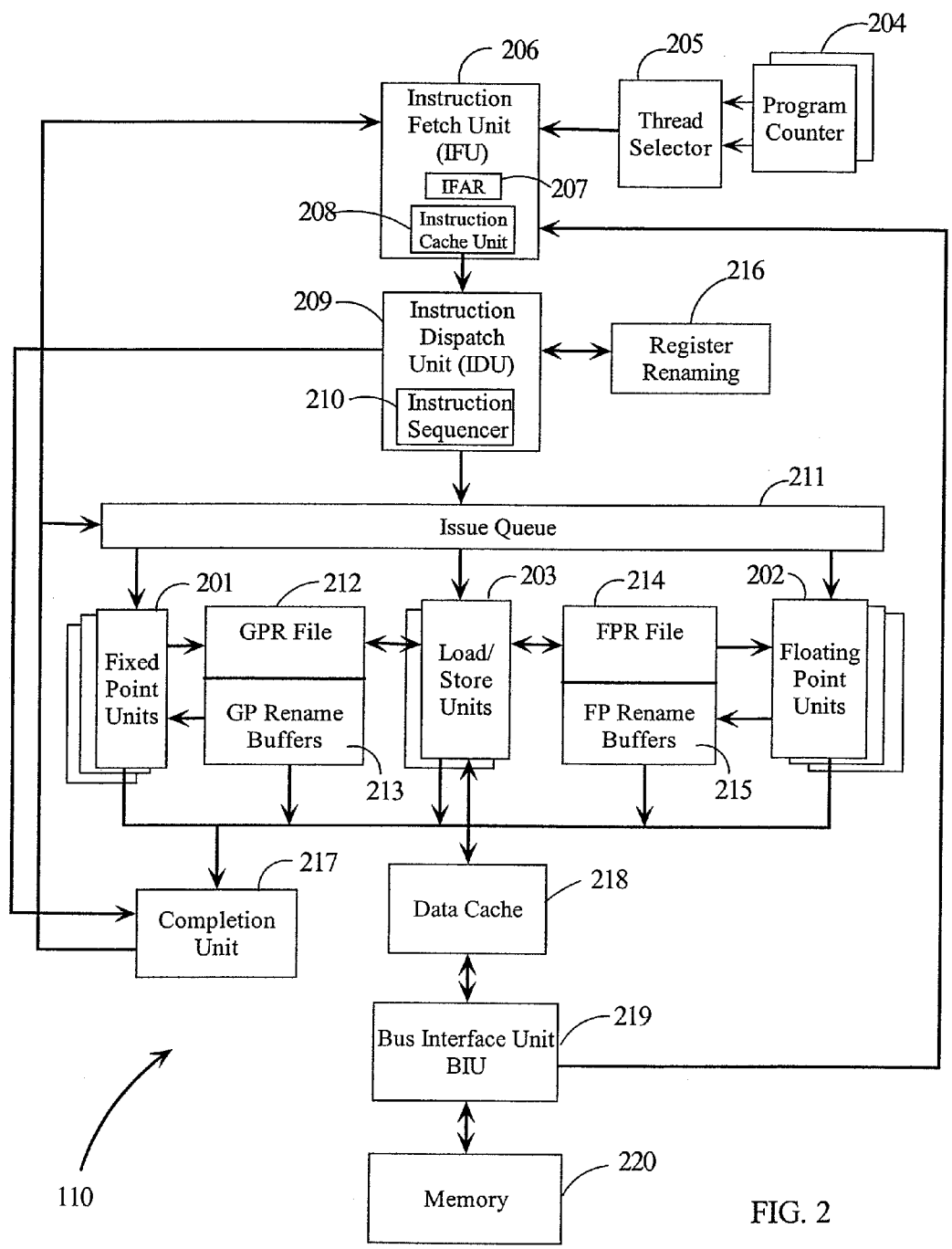
FIG. 2 illustrates an embodiment of the present invention of a simultaneous multithreading processor.

FIG. 2—Simultaneous Multithreading Processor

FIG. 2 illustrates an embodiment of a simultaneous multithreading processor 110. Multithreading processor 110 may be configured to execute multiple instructions per clock cycle. Further, processor 110 may be configured to simultaneous execute instructions from multiple threads as discussed further below. These instructions may be executed in any of the execution units of processor 110 including Fixed Point Units (FXUs) 201, Floating Point Units (FPUs) 202 and Load/Store Units (LSUs) 203 during any one clock cycle. It is noted that processor 110 may comprise other execution units, such as branch execution units, and that processor 110 is not limited in scope to any one particular embodiment. It is further noted that processor 110 may include additional units, registers, buffers, memories, and other sections than illustrated in FIG. 2. Some of the elements described below, such as issue queues 211, FXUs 201, FPUs 202, LSUs 203, may be referred to either collectively or individually, e.g., FXUs 201, FXU 201. Although processor 110 is described below as executing instructions from two threads, processor 110 may be configured to execute instructions from any number of threads.

Processor 110 may comprise Program Counters (PCs) 204 that correspond to multiple threads, e.g., thread one, thread two, which have instructions for execution. A thread selector 205 may toggle on each clock cycle to select which thread to be executed. Upon selection of a particular thread, an Instruction Fetch Unit (IFU) 206 may be configured to load the address of an instruction from PCs 204 into Instruction Fetch Address Register 207. The address received from PCs 204 may be an effective address representing an address from the program or compiler. The instruction corresponding to the received effective address may be accessed from Instruction Cache (I-Cache) unit 208 comprising an instruction cache (not shown) and a prefetch buffer (not shown). The instruction cache and prefetch buffer may both be configured to store instructions. Instructions may be inputted to instruction cache and prefetch buffer from a system memory 220 through a Bus Interface Unit (BIU) 219.

Instructions from I-Cache unit 208 may be outputted to Instruction Dispatch Unit (IDU) 209. IDU 209 may be configured to decode these received instructions. At this stage, the received instructions are primarily alternating from one thread to another. IDU 209 may further comprise an instruction sequencer 210 configured to forward the decoded instructions in an order determined by various algorithms. The out-of-order instructions may be forwarded to one of a plurality of issue queues 211 where a particular issue queue 211 may be coupled to one or more particular execution units, fixed point units 201, load/store units 203 and floating point units 202. Each execution unit may execute one or more instructions of a particular class of instructions. For example, FXUs 201 may execute fixed point mathematical and logic operations on source operands, such as adding, subtracting, ANDing, ORing and XORing. FPUs 202 may execute floating point operations on source operands, such as floating point multiplication and division. FXUs 201 may input their source and operand information from General Purpose Register (GPR) file 212 and output their results (destination operand information) of their operations for storage at selected entries in General Purpose rename buffers 213. Similarly, FPUs 202 may input their source and operand information from Floating Point Register (FPR) file 214 and output their results (destination operand information) of their operations for storage at selected entries in Floating Point (FP) rename buffers 215.

Processor 110 may dynamically share processor resources, such as execution units, among multiple threads by renaming and mapping unused registers to be available for executing an instruction. This may be accomplished by register renaming unit 216 coupled to IDU 209. Register renaming unit 216 may be configured to determine the registers from the register file, e.g., GPR file 212, FPR file 214, that will be used for temporarily storing values indicated in the instructions decoded by IDU 209.

As stated above, instructions may be queued in one of a plurality of issue queues 211. If an instruction contains a fixed point operation, then that instruction may be issued by an issue queue 211 to any of the multiple FXUs 201 to execute that instruction. Further, if an instruction contains a floating point operation, then that instruction may be issued by an issue queue 211 to any of the multiple FPU's 202 to execute that instruction.

All of the execution units, FXUs 201, FPUs 202, LSUs 203, may be coupled to completion unit 217. Upon executing the received instruction, the execution units, FXUs 201, FPUs 202, LSUs 203, may transmit an indication to completion unit 217 indicating the execution of the received instruction. This information may be stored in a table (not shown) which may then be forwarded to IFU 206. Completion unit 217 may further be coupled to IDU 209. IDU 209 may be configured to transmit to completion unit 217 the status information, e.g., type of instruction, associated thread, of the instructions being dispatched to issue queues 211. Completion unit 217 may further be configured to track the status of these instructions. For example, completion unit 217 may keep track of when these instructions have been "completed." An instruction may be said to be "completed" when it has executed and is at a stage where any exception will not cause the reissuance of this instruction. Completion unit 217 may further be coupled to issue queues 211 and further configured to transmit an indication of an instruction being completed to the appropriate issue queue 211 that issued the instruction that was completed.

LSUs 203 may be coupled to a data cache 218. In response to a load instruction, LSU 203 inputs information from data cache 218 and copies such information to selected ones of rename buffers 213, 215. If such information is not stored in data cache 218, then data cache 218 inputs through Bus Interface Unit (BIU) 219 such information from a system memory 220 connected to system bus 112 (see FIG. 1). Moreover, data cache 218 may be able to output through BIU 219 and system bus 112 information from data cache 218 to system memory 220 connected to system bus 112. In response to a store instruction, LSU 203 may input information from a selected one of GPR 212 and FPR 214 and copies such information to data cache 218.

It is noted that processor 110 may comprise any number of execution units, e.g., FXUs 201, FPUs 202, LSUs 203, any number of issue queues 211, program counters 201 representing threads, GPRs 212 and FPRs 214, and that processor 110 is not to be confined in scope to any one particular embodiment.

Figure 3:
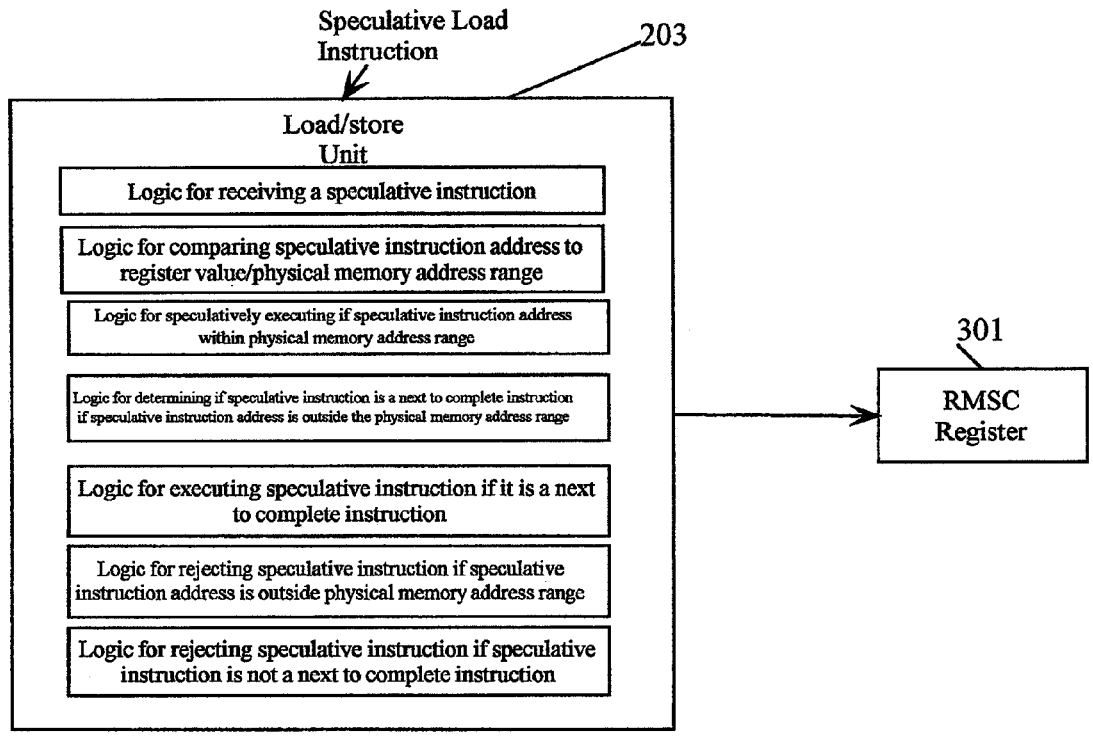
FIG. 3 illustrates a mechanism for allowing a processor to speculatively execute instructions while avoiding check stops when operating in real mode in accordance with an embodiment of the present invention.
Figure 4:
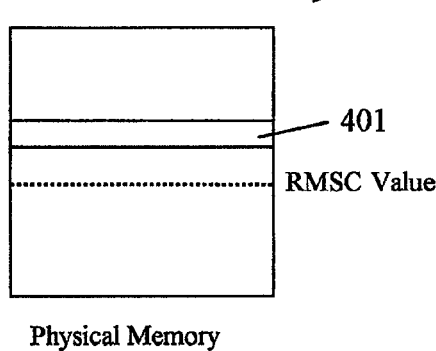
FIG. 4 illustrates an embodiment of the present invention of a physical memory space.
Figure 5:
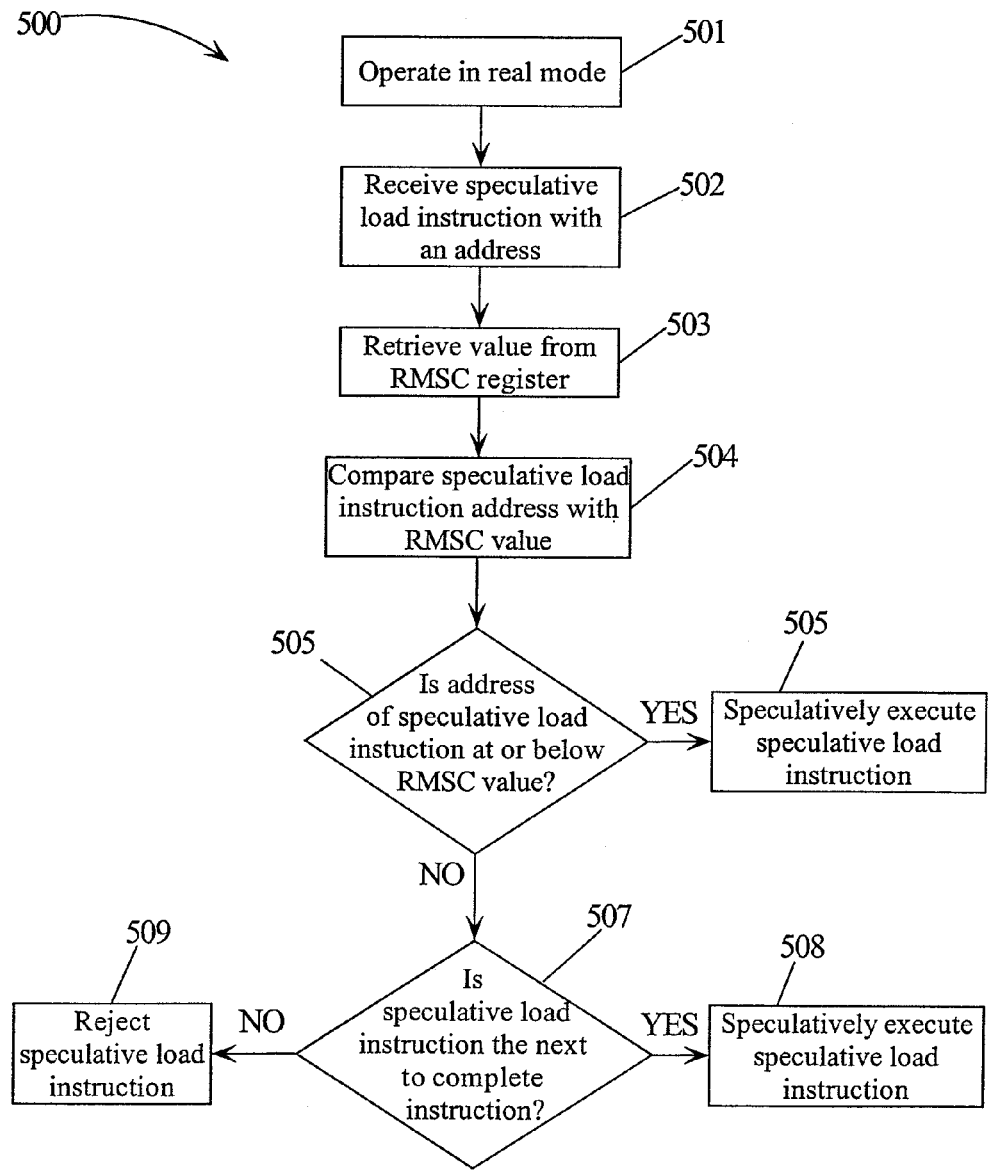
FIG. 5 is a flowchart of a method for avoiding check stops in speculative accesses in accordance with an embodiment of the present invention.

As stated in the Background Information section, in a computer system incorporating out-of-order execution, certain instructions, e.g., a load instruction, may not be speculatively executed in order to prevent a check stop from occurring while operating in real mode. For example, upon the processor predicting whether a branch instruction will be taken or not taken, the processor may not speculatively execute a load instruction in order to prevent a check stop from occurring while operating in real mode. By prohibiting speculative execution of certain instructions, such as load instructions, to ensure against check stops, processor performance is hindered. Therefore, there is a need in the art to be able to speculatively execute instructions while avoiding check stops when operating in real mode. FIGS. 3-4 illustrate an embodiment of the present invention of a mechanism for allowing processor 110 to speculatively execute instructions, e.g., load instructions, while avoiding check stops when operating in real mode. FIG. 5 is a flowchart of a method for avoiding check stops in speculative accesses when processor 110 is operating in real mode using the mechanism described in FIGS. 3-4.

FIG. 3—Mechanism for Allowing a Processor to Speculatively Execute Instructions While Avoiding Check Stops When Operating in Real Mode FIG. 3 illustrates an embodiment of the present invention of a mechanism for allowing processor 110 to speculatively execute instructions, such as a load instruction, while avoiding check stops when operating in real mode. LSU 203 may receive a speculative load instruction with an address (effective address) from issue queue 211 while processor 110 is operating in real mode. As stated above, real mode may refer to a mode where no virtual address translation is performed. That is, the effective address, i.e., the address of the program or compiler, is used as the real address, i.e., the address of the physical memory. The speculative load instruction may be received after processor 110 speculated to take or not take a branch instruction. Upon receiving the speculative load instruction while processor 110 is operating in real mode, LSU 203 may be configured to search a register 301, referred to herein as the "Real Mode Storage Control (RMSC) register," coupled to LSU 203 for a value, referred to herein as the "RMSC value." The RMSC value may correspond to an address in the physical memory space of RAM 114 (see FIG. 1) as illustrated in FIG. 4. Addresses at or below the RMSC value may correspond to real addresses that exist in physical memory space.

Referring to FIG. 4, there is illustrated an embodiment of the present invention of the physical memory space 400 of RAM 114. If the address (effective address) of the speculative load instruction is at or below the RMSC value, then LSU 203 may safely execute the speculative load instruction while avoiding a check stop when operating in real mode. LSU 203 may safely execute the speculative load instruction if the address (effective address) of the speculative load instruction is at or below the RMSC value since all the addresses at or below the RMSC value are known to exist in physical memory 400. Addresses above the RMSC value may contain holes or gaps 401 where there are no valid addresses in physical memory 400. If the effective address of the speculative load instruction corresponds to an address within one of those holes or gaps 401, then a check stop may occur.

If the effective address of the speculative load instruction is above the RMSC value, LSU 203 may determine if the speculative load instruction is a "next to complete instruction." As stated above, an instruction may be said to be "completed" when it has executed and is at a stage where any exception will not cause the re-issuance of this instruction. The "next to complete instruction" is the instruction following the completed instruction with the highest priority to be executed. In one embodiment, completion unit 217 may transmit an indication of the speculative load instruction being a "next to complete instruction" to LSU 203. In another embodiment, completion unit 217 may comprise a table configured to track the status of instructions dispatched to issue queues 211. The table may transmit a tag (a series of bits used to identify an instruction) of the oldest instruction in the table to LSU 203. LSU 203 may compare the received tag with a tag of the speculative load instruction. If there is a match, then the speculative load instruction may be deemed to be a "next to complete instruction."

If the speculative load instruction is a "next to complete instruction," then LSU 203 may execute the speculative load instruction. It is noted that a check stop may still occur. However, if a check stop occurs upon executing the next to complete instruction, it is due to a program error and not due to speculative activity.

If, however, the speculative load instruction is not a "next to complete instruction," then LSU 203 may reject the speculative load instruction. "Rejection" may refer to LSU 203 transmitting the speculative load instruction back to issue queue 211 that transmitted the instruction. The rejected instruction may be reloaded in the entry in issue queue 211 it was previously located and later reissued by issue queue 211 to LSU 203 after a designated number of cycles. By LSU 203 not speculatively executing load instructions that are not "next to complete instructions" with addresses above the RMSC value when processor 110 operates in real mode, a check stop may be avoided. Thus, LSU 203 may speculatively execute load instructions with an address at or below the RMSC value thereby avoiding check stops when operating in real mode. LSU 203 may not speculatively execute load instructions that are not "next to complete instructions" with addresses above the RMSC value because of the possibility of a check stop occurring.

FIG. 5—Method for Avoiding Check Stops in Speculative Accesses

FIG. 5 is a flowchart of one embodiment of the present invention of a method 500 for speculatively executing instructions, such as load instructions, while avoiding check stops when processor 110 (see FIG. 2) operates in real mode.

Referring to FIG. 5, in conjunction with FIGS. 2-4, in step 501, processor 110 operates in real mode. Real mode, as stated above, may refer to a mode where no virtual address translation is performed. That is, the effective address, i.e., the address of the program or compiler, is used as the real address, i.e., the address of the physical memory.

In step 502, an execution unit, such as LSU 203, receives a speculative instruction, such as a speculative load instruction, with an address (effective address) from issue queue 211 coupled to LSU 203. The speculative load instruction may be received by LSU 203 after processor 110 speculated to take or not take a branch instruction.

In step 503, LSU 203 retrieves a value stored in RMSC register 301. As stated above, this value refers to an address in physical memory 400. Addresses that are at or below the RMSC value are known to exist in physical memory 400. That is, there are no holes or gaps 401 in the address range below the RMSC value.

In step 504, LSU 203 compares the speculative load instruction address with the RMSC value.

In step 505, a determination is made by LSU 203 as to whether the address (effective address) of the received speculative load instruction is at or below the RMSC value. If the address of the received speculative load instruction is at or below the RMSC value, then LSU 203, in step 506, speculatively executes the speculative load instruction. LSU 203 may safely execute the speculative load instruction, if the address (effective address) of the speculative load instruction is at or below the RMSC value, since all the addresses at or below the RMSC value are known to exist in physical memory 400. Hence, LSU 203 may safely execute the speculative load instruction, if the address (effective address) of the speculative load instruction is at or below the RMSC value, without a check stop occurring when processor 110 operates in real mode.

If, however, the address of the received speculative load instruction is above the RMSC value, then a determination is made by LSU 203, in step 507, as to whether the speculative load instruction is a "next to complete instruction." As stated above, an instruction may be said to be "completed" when it has executed and is at a stage where any exception will not cause the reissuance of this instruction. The "next to complete instruction" is the instruction following the completed instruction with the highest priority to be executed. In one embodiment, completion unit 217 may transmit an indication of the speculative load instruction being a "next to complete instruction" to LSU 203. In another embodiment, completion unit 217 may comprise a table configured to track the status of instructions dispatched to issue queues 211. The table may transmit a tag (a series of bits used to identify an instruction) of the oldest instruction in the table to LSU 203. LSU 203 may compare the received tag with a tag of the speculative load instruction. If there is a match, then the speculative load instruction may be deemed to be a "next to complete instruction."

If the speculative load instruction is a "next to complete instruction," then LSU 203 speculatively executes the speculative load instruction in step 508.

If, however, the speculative load instruction is not a "next to complete instruction," then, in step 509, LSU 203 rejects the speculative load instruction. "Rejection" may refer to LSU 203 transmitting the speculative load instruction back to issue queue 211 that transmitted the instruction. The rejected instruction may be reloaded in the entry in issue queue 211 it was previously located and later reissued by issue queue 211 to LSU 203 after a designated number of cycles.

It is noted that method 500 may be executed in a different order presented and that the order presented in the discussion of FIG. 5 is illustrative. It is further noted that certain steps in method 500 may be executed in a substantially simultaneous manner.

Although the method and processor are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims.

The invention claimed is:

1. A processor, comprising:
   a queue configured to store instructions;
   an execution unit coupled to said queue, wherein said execution unit is configured to receive an instruction from said queue; and
   a register coupled to said execution unit, wherein said register is configured to store a value corresponding to an address in physical memory, wherein said execution unit further comprises:

logic for receiving a speculative instruction with an address from said queue;

logic for comparing said speculative instruction address with said value from said register to determine whether said speculative instruction address exists in physical memory;

logic for executing said speculative instruction if said address of said speculative instruction is at or below said value;

logic for determining if said speculative instruction is a next to complete instruction if said address of said speculative instruction is above said value;

logic for executing said speculative instruction if said speculative instruction is said next to complete instruction; and logic for rejecting said speculative instruction if said speculative instruction is not a next to complete instruction and if said address of said speculative instruction is above said value to thereby avoid a check stop due to speculative activity.

2. A load/store unit, comprising:

logic for receiving a speculative instruction with an address;

logic for comparing said speculative instruction address to an address range in physical memory to determine whether said speculative instruction address exists in physical memory;

logic for speculatively executing said speculative instruction if said address of said speculative instruction is within said address range in physical memory;

logic for determining if said speculative instruction is a next to complete instruction if said address of said speculative instruction is outside said address range in physical memory;

logic for executing said speculative instruction if said speculative instruction is said next to complete instruction; and logic for rejecting said speculative instruction if said address of said speculative instruction is outside said address range in physical memory and if said speculative instruction is not said next to complete instruction to thereby avoid a check stop due to speculative activity.

\* \* \* \* \*